(12) United States Patent
Lakanen et al.

(10) Patent No.: US 10,357,783 B2
(45) Date of Patent: Jul. 23, 2019

(54) ENHANCED METHOD AND ARRANGEMENT FOR GAS REGULATION IN MINERAL FLOTATION

(71) Applicant: OUTOTEC (FINLAND) OY, Espoo (FI)

(72) Inventors: Jukka Lakanen, Espoo (FI); Rodrigo Grau, Pori (FI); Kaisa Miinalainen, Espoo (FI)

(73) Assignee: OUTOTEC (FINLAND) OY, Espoo (FI)

( * ) Notice: Subject to any disclaimer, the term of this patent is extended or adjusted under 35 U.S.C. 154(b) by 378 days.

(21) Appl. No.: 15/316,692

(22) PCT Filed: Jun. 11, 2015

(86) PCT No.: PCT/FI2015/050417
§ 371 (c)(1),
(2) Date: Dec. 6, 2016

(87) PCT Pub. No.: WO2015/189474
PCT Pub. Date: Dec. 17, 2015

(65) Prior Publication Data
US 2017/0197221 A1    Jul. 13, 2017

(30) Foreign Application Priority Data

Jun. 12, 2014 (FI) .................... 20145543

(51) Int. Cl.
*B03D 1/14* (2006.01)
*B03D 1/24* (2006.01)
*B03D 1/02* (2006.01)

(52) U.S. Cl.
CPC ............. *B03D 1/24* (2013.01); *B03D 1/02* (2013.01); *B03D 1/028* (2013.01); *B03D 2203/02* (2013.01)

(58) Field of Classification Search
CPC .............. B03D 1/24; B03D 1/02; B03D 1/14
See application file for complete search history.

(56) References Cited

U.S. PATENT DOCUMENTS

| 3,954,450 A | 5/1976 | Kuhn et al. |
| 4,331,635 A | 5/1982 | Arbiter et al. |

(Continued)

FOREIGN PATENT DOCUMENTS

| FI | 20135787 A | 1/2015 |
| GB | 1404245 A | 8/1975 |
| WO | WO-2004080599 A1 | 9/2004 |

OTHER PUBLICATIONS

International Preliminary Report on Patentability (Chapter II of the Patent Cooperation Treaty) issued by the European Patent Office in relation to International Application PCT/FI2015/050417 dated Sep. 27, 2016 (15 pages).

(Continued)

*Primary Examiner* — Ellen M McAvoy
(74) *Attorney, Agent, or Firm* — Robert P. Michal, Esq.; Carter, DeLuca & Farrell LLP

(57) ABSTRACT

A method for controlling gas circulation in a mineral flotation process in a system including one or more flotation cell unit(s) with an apparatus including a gas recirculation loop, a flushing system including an expulsion line for connecting pressure side of the gas recirculation loop to atmosphere and a suction line including a water lock, or means, other than a water lock, for restricting the gas flow and preventing back flow of unpurified gas to the atmosphere, for connecting suction side of the gas recirculation loop to the atmosphere.

15 Claims, 6 Drawing Sheets

(56) References Cited

U.S. PATENT DOCUMENTS

| | | | |
|---|---|---|---|
| 4,436,617 A | | 3/1984 | Moore et al. |
| 4,892,648 A | | 1/1990 | Kulkarni |
| 5,399,267 A | * | 3/1995 | Wang .................. B09C 1/02 |
| | | | 210/604 |
| 5,762,781 A | * | 6/1998 | Bodnaras ............ B03D 1/1475 |
| | | | 209/164 |
| 6,032,805 A | | 3/2000 | Clark et al. |
| 6,036,025 A | | 3/2000 | Clark et al. |
| 6,041,941 A | | 3/2000 | Newell et al. |
| 6,044,978 A | | 4/2000 | Newell et al. |
| 7,789,332 B2 | * | 9/2010 | Heimala ................ C22B 3/04 |
| | | | 241/20 |
| 2018/0353971 A1 | * | 12/2018 | Lakanen ................ B03D 1/028 |

OTHER PUBLICATIONS

Finnish Search Report issued by the Finnish Patent and Registration Office in relation to Finnish Application No. 20145543 dated Feb. 5, 2015 (2 pages).

* cited by examiner

Figure 6

ENHANCED METHOD AND ARRANGEMENT FOR GAS REGULATION IN MINERAL FLOTATION

CROSS-REFERENCE TO RELATED APPLICATIONS

This application is a National Phase Entry under 35 USC § 371 of PCT Patent Application Ser. No. PCT/FI2015/050417 filed Jun. 11, 2015, which claims priority to Finnish Patent Application No. 20145543, filed Jun. 12, 2014, the disclosure of each of these applications is expressly incorporated herein by reference in their entirety.

FIELD OF THE INVENTION

The present invention relates to a method of controlling gas circulation in mineral flotation for separation of minerals from ore and concentrates, in particularly in separating molybdenum from copper containing sulfide minerals.

BACKGROUND OF THE INVENTION

For froth flotation, the ground ore is mixed with water to form a slurry and the desired mineral is rendered hydrophobic by the addition of a surfactant or a collector chemical, such as a depressant, although some mineral surfaces are naturally hydrophobic requiring little or no addition of collector. The particular chemical depends on the nature of the mineral to be recovered and, perhaps, the natures of those that are not wanted. As an example, sodium hydrosulfide (NaHS) may be added as a depressant in the selective flotation of molybdenum to separate it from copper. This slurry of hydrophobic particles and hydrophilic particles is then introduced to tanks known as flotation cells that are aerated to produce bubbles. The hydrophobic particles attach to the gas bubbles, which rise to the surface, forming a froth. The froth is removed from the cell, producing a concentrate of the target mineral.

The minerals that do not float into the froth are referred to as the flotation tailings or flotation tails. These tailings may also be subjected to further stages of flotation to recover the valuable particles that did not float the first time. This is known as scavenging. The final tailings after scavenging are normally pumped for disposal as mine fill or to tailings disposal facilities for long-term storage.

Flotation is normally undertaken in several stages to maximize the recovery of the target mineral or minerals and the concentration of those minerals in the concentrate, while minimizing the energy input.

Addition of flotation reagents is adjusted based on the pH and redox potential measured from the slurry. High content of oxygen in a flotation cell is known to increase the consumption of the flotation reagent and increase flotation costs. Therefore several methods for controlling the oxygen content of the utilized process gas, i.e. flotation gas, have been developed.

WO2004/080599 discloses a method for separating minerals from a slurry containing valuable minerals, wherein gases fed in different process steps, including flotation, are recirculated in an essentially closed gas circulation created around the equipment used. According to the publication, in flotation, the recirculation of the flotation gases allows more efficient optimization of the froth structure. In accordance with the method disclosed in the publication grinding, flotation, precipitation and filtering should all be performed in a fully sealed, controlled recirculating gas atmosphere.

Replacing air with a non-oxidizing inert gas in mineral separation has been proposed, for instance in U.S. Pat. Nos. 6,032,805, 6,036,025, 6,041,941 and U.S. Pat. No. 6,044,978.

In some certain flotation processes, in which it is required to use inert gas as flotation gas, there is an economic incentive to partially or fully capture and reuse the flotation gas, in order to reduce the consumption and thus the cost of the said inert gas (e.g. nitrogen). When using forced-air type flotation machines, the flotation cells are fed with gas which is pressurized with a compressor or blower. Therefore the recirculation system has to be able to collect the gas from the cells and redirect the gas back to the compressor or blower in a closed-loop piping arrangement i.e. a flotation gas recirculation loop.

In some cases, the flotation reagents used may cause unintentional formation of harmful byproduct gases (e.g. $H_2S$). When such gases are formed, the gas collection and supplying system has to be hermetically sealed in order to keep the harmful byproduct gases contained. Also, the efficiency and economy of the system is better when the system allows less losses of inert flotation gas.

Thus, a conventional gas recirculation system is mechanically sealed. However, due to the variability of the volume of natural gases, the sealed flotation system has to have some means to compensate for volume changes. For this, special equipment called gas buffer tank is commonly used. It is able to store and release extra volume of flotation gas when needed. This may happen, for example, when the flotation blowers are shut down and the bubbles in the slurry are released into the recirculation piping, causing the internal total volume of gas in the system to expand. Also, when the outside temperature or ambient air pressure fluctuates, so has to happen also to the gas inside the system, or otherwise mechanical loading due to internal and external pressure differences are incurred to the flotation machines and piping.

Therefore the existing methods do not allow utilization of a closed system with controlled point of release for expulsed flotation system without a need for expensive and large gas buffer tank.

BRIEF DESCRIPTION OF THE INVENTION

An object of the present invention is thus to provide a method and an apparatus for implementing the method so as to so as to alleviate the above disadvantages. The objects of the invention are achieved by a method and an arrangement, which are characterized by what is stated in the independent claims. The preferred embodiments of the invention are disclosed in the dependent claims.

The invention is based on the idea of allowing a small fraction volume of a recirculating flotation gas to bypass flotation cells by supplying the said volume via an "expulsion line" to outside of the gas recirculation loop, i.e. either directly to the atmosphere or into a "flushing line", which is always atmospheric, and from which the gases may exit to the atmosphere, and a "suction line" through which the gas can also flow towards the flotation system. These lines allow to either expulse excessive flotation gas or import gas to the system when it so needs. The expulsion line also provides a controlled point of release for expulsed flotation gas without a need for a large and expensive gas buffer tank. Thus the present invention provides a method for efficient recirculation of flotation gases without a requirement for a gas buffer tank. Instead, the gas volume fluctuations are handled by a flushing system comprising an expulsion line for connecting the pressure side of the gas recirculation loop to atmosphere for allowing expulsion of a small part of the flotation gas from the gas recirculation loop, and a suction line comprising a water lock, or means, other than a water lock, for restricting gas flow through the suction line and preventing back flow of unpurified gas to the atmosphere, for connecting the suction side of the gas recirculation loop to the atmosphere e.g. either directly or via a flushing line and for allowing gas, either in the atmosphere or present in the flushing line, to be withdrawn into the suction side of the gas recirculation loop, e.g. either directly to the gas suction conduit or via any one of the flotation cell units, through the suction line thereby providing underpressure to the suction side of the gas recirculation loop i.e. to the said conduit and thus to the flotation cell unit(s).

BRIEF DESCRIPTION OF THE DRAWINGS

In the following the invention will be described in greater detail by means of preferred embodiments with reference to the attached drawings, in which

FIG. 6 shows a sixth embodiment of the arrangement of the present invention for circulation of gases in a mineral flotation process.

DETAILED DESCRIPTION OF THE INVENTION

Figure 1:
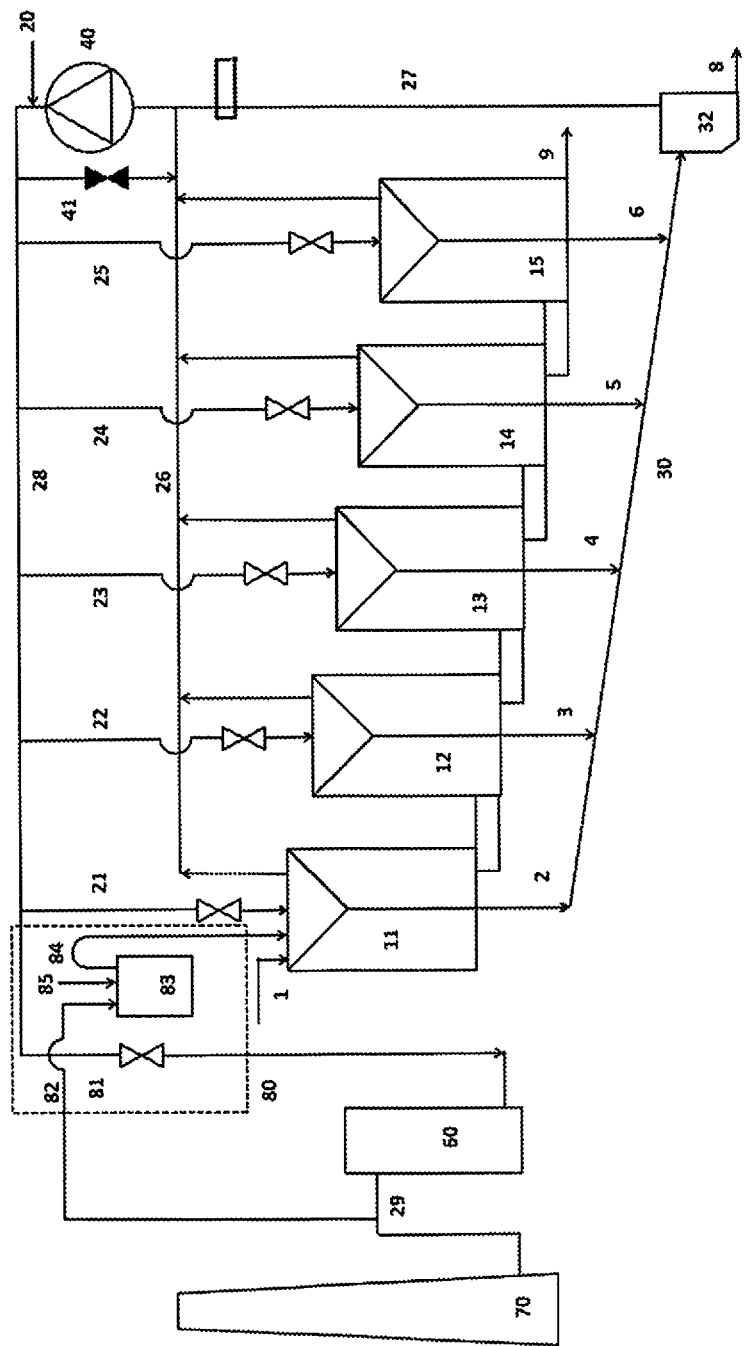
FIG. 1 shows a first embodiment of the arrangement of the present invention for circulation of gases in a mineral flotation process.

The present invention relates to a method for controlling gas circulation in a mineral flotation process in a system comprising one or more flotation cell unit(s) with an apparatus comprising a gas recirculation loop, a flushing system comprising an expulsion line and a suction line comprising a water lock, or means, other than a water lock, for restricting gas flow through the suction line and preventing back flow of unpurified gas to the atmosphere, and one or more flotation cell units, comprising supplying flotation gas from the gas recirculation loop to each of the flotation cell units;

expulsing a part of the flotation gas from pressure side of the gas recirculation loop via the expulsion line;

allowing gas to be withdrawn into suction side of the gas recirculation loop through the suction line, thereby providing underpressure to the suction side of the gas recirculation loop and to the flotation cell unit(s); and collecting flotation gas from the headspace(s) of the sealed flotation cell unit(s) and recirculating the collected flotation gas back to the flotation cell units via the gas recirculation loop.

The "term flotation cell unit" as used herein refers to a single individual flotation cell or to a bank of flotation cells, i.e. a serial arrangement of flotation cells where tailings from the first cell move on as the feed to the second cell and so on and the tailings from the last cell form the final tailings of the bank. The number of cells in a bank varies depending on cell size, application and plant circuit configuration. The flotation cell units of the invention are typically sealed flotation cell units, i.e. hermetically sealed flotation cells keeping harmful byproduct gases contained.

Flotation gas is collected from the headspaces of the sealed flotation cells and recirculated back to the flotation cells through a gas recirculation loop. The recirculated flotation gas is pressurized in a compressor or a blower, preferably a liquid ring compressor, before it is fed back to the flotation cells. Process gas is added to the gas recirculation loop if necessary. It is to be understood that the recirculation loop is provided with the necessary structures, such as pipelines, lids, seals, vents, blowers etc. required for ensuring recovery and recirculation of gas and its maintenance in the system as well as pressure balancing. If desired the recirculating flotation gas may be scrubbed by a gas scrubber included in the gas recirculation loop to remove solid particles and/or other harmful or undesired substances, e.g. $H_2S$, from the gas before it is reintroduced into the flotation cells.

In accordance with the present invention the flotation gas is provided to the system initially as pressurized process gas, fed to flotation cells, and recirculated from all of the flotation cells in the system. The flotation gas is preferably oxygen-deficient, i.e. it is either free of oxygen gas or contains a volume fraction of oxygen gas that is lower than the volume fraction of oxygen gas in ambient air. The flotation gas is preferably an inert gas that is essentially free of oxygen gas or has only a very low oxygen gas content. In a preferred embodiment, the flotation gas consists essentially of inert gas or has a very high content of inert gas, for example, nitrogen, argon, helium and/or carbon dioxide, with nitrogen gas being particularly preferred as the inert gas. However, initially the flotation gas may be ambient air, which during the process is depleted of oxygen as it is consumed by reactions between the flotation reagent and the feed. The flotation gas preferably comprises at least 85 volume percent of inert gas, which may be a mixture of multiple inert gas components, more preferably at least 90 volume percent, even more preferably at least 95 volume percent, and most preferably the flotation gas consists essentially of only inert gas. When the flotation gas includes some oxygen gas, it should be only a small amount, as noted. Preferably, the flotation gas comprises no more than 15 volume percent oxygen gas, more preferably no more than 10 volume percent oxygen gas and even more preferably no more than 5 volume percent oxygen gas.

Process gas is typically added to the gas recirculation system in an amount that is required to maintain the amount of flotation gas at desirable level. The added process gas may be any of the gases discussed above, in particular inert gas such as nitrogen. Process gas can be introduced into the gas recirculation loop either to the suction side of the recirculating compressor or to the pressure side of the recirculating compressor. When liquid ring compressor is utilized as the recirculating compressor, process gas is preferably introduced into the gas recirculation loop in the pressure side of the recirculating compressor.

The flushing system serves to adjust pressure of the flotation gas in the flotation system. As desired a part of the flotation gas is expulsed to the atmosphere through the expulsion line which comprises a control valve that is operated to adjust the flow of the expulsed flotation gas and which prevents the backflow of the flotation gas to the gas feed manifold. The expulsion line connects pressure side of the gas recirculation loop to atmosphere either directly or through a flushing line. The flushing line optionally comprises a gas scrubber for scrubbing the expulsed flotation gas. The amount of the expulsed flotation gas is selected such that it exceeds the amount of process gas added after the compressor, in order to ensure that the volume of gas directed to the flotation cells does not exceed the volume flow produced by the compressor or blower. This, then, ensures that the suction side of the compressor or blower is volume deficient and forces the system to complete the volume by sucking expulsed gas back in via the flushing system, in particular the suction line which connects suction side of the gas recirculation loop to atmosphere, which then again ensures the cell headspaces to be in a negative pressure as set by the water lock resistance or the means, other than a water lock, for restricting the gas flow through the suction line and preventing back flow of unpurified gas to the atmosphere. This provides for constant controlled flushing of the recirculating gas with provided process gas, typically nitrogen. Preferably, the expulsed flotation gas flow is set to be very small to prevent a possibility that the part of the flotation gas which is directed to the flushing line, is lost or mixed with air, thus potentially introducing air/oxygen into the system. Preferably the expulsed flotation gas flow is equal to at least 1%, preferably from 2 to 70%, more preferably from 2 to 10%, even more preferably from 2 to 3%, of the compressor volume throughput added with the amount of new process gas added to the system.

When the pressure of the suction side of the gas recirculation loop, e.g. pressure of the flotation cell unit(s), in particular the pressure of the gas suction conduit which is connected to the flotation cell headspace(s), is less than atmospheric then gas, either ambient air from the atmosphere or gas present in the flushing line, is drawn into the suction side of the gas recirculation loop e.g. directly into the gas suction conduit or via one or more, typically the first, of the flotation cell units, through the suction line. The suction line comprises a water lock, or means, other than a water lock, for restricting gas flow and preventing back flow of unpurified gas to the atmosphere, through which the suction side of the gas recirculation loop may suck more gas into the system.

The term "means for restricting the gas flow and preventing back flow of unpurified gas to the atmosphere" refers to a single device or a combination of devices able act as a gas restrictor i.e. to restrict gas flow through the suction line and thus to reduce the gas pressure of the gas flowing from the atmospheric side of the suction line to the flotation cell side of the suction line and as an interlock cutting off back flow of the unpurified flotation gas to the atmosphere.

A suction line comprising means for restricting the gas flow and preventing back flow of unpurified gas to the atmosphere permits control of the gas pressure and operation of the flotation cells in slight underpressure while restricting the interchange of gases between the suction side of the gas recirculation loop, e.g. the gas suction conduit and the flotation cell unit(s), and the atmosphere by the pressure difference caused by the means for restricting the gas flow. Further, the means for preventing back flow of unpurified gas to the atmosphere ensure that unpurified flotation gas is not expulsed directly into the atmosphere.

With the means for restricting the gas flow and preventing back flow of unpurified gas to the atmosphere the headspaces of the flotation cell unit(s) can be maintained under an underpressure, preferably from 2 to 10 mbar, more preferably from 5 to 8 mbar.

As discussed above when the means for restricting the gas flow and preventing back flow of unpurified gas to the atmosphere is provided a combination of devices it preferably comprises a gas restrictor and an interlock. The gas restrictor may be inserted and mounted permanently to the suction line or it may be interchangeable. The interlock may be positioned at either side of the gas restrictor; preferably the interlock is positioned between the gas restrictor and the atmosphere.

The gas restrictor may for example be a rigid disk or cylinder having an aperture at the central cylindrical axis. The opening size of the aperture in diameter and length is chosen to insure that the gas flow is properly restricted in reducing the pressure in the flotation cell side of the suction line. The desired pressure may be adjusted by adjusting the diameter of the aperture. As for another example the air restrictor may be a membrane or a packed-bed unit. The membrane type or the material of the packed-bed is chosen to insure that the gas flow is properly restricted in reducing the pressure in the flotation cell side of the suction line. As for still another example the air restrictor may be a pressure reducing valve. The pressure reducing valve may be adjustable for providing desired pressure either manually or automatically. Examples of suitable air restrictors include, but are not limited to, choke tubes, choke pipes, choke orifice plates, flow restricting membranes and flow restricting packed-bed units. When an interchangeable choke pipe or a flow restricting packed-bed unit is utilized, the length of the chock pipe or the flow restricting packed-bed unit, respectively, is preferably less than 3 m.

Examples of suitable interlocks include, but are not limited to, no-return valves, check valves, and backflow barriers.

As an another example the interlock may be provided as a gas scrubber comprising a bypass conduit for replacing the volume of gas forced through the gas scrubber and allowing gas to be withdrawn into suction side of the gas recirculation loop, whereby either by a sucking action of a high pressure venturi scrubber or by a blowing action caused by a blower or compressor positioned in connection of the gas scrubber, any expulsed unpurified flotation gas is forced to flow through the gas scrubber towards the atmosphere.

The means, other than a water lock, for restricting the gas flow and preventing back flow of unpurified gas to the atmosphere may be a control valve. The control valve is operated to adjust the flow the gas allowed to be withdrawn into suction side of the gas recirculation loop through the suction line and to prevent the backflow of the unpurified flotation gas to the atmosphere. The degree of partially opening the valve may be utilized to provide the desired pressure. The opening and closing of the control valve is preferably done automatically in response to control signals received from the suction side of the gas recirculation loop. In case of back flow of unpurified flotation gas for any reason, the control valve will close the flow to the atmosphere.

A particular single device example of means for restricting the gas flow and preventing back flow of unpurified gas to the atmosphere is a water lock.

When a water lock is utilized, the water lock depth sets a pressure limit, which then becomes the required underpressure in the flotation cell gas collection side (cell headspaces) for the gas to flow from the flushing line towards the cells.

Typically the gas present in the flushing line is flotation gas expulsed from the gas recirculation loop. When the flushing line comprises a gas scrubber, gas is preferably withdrawn from the flushing line after the gas scrubber to allow withdrawal of scrubbed expulsed flotation gas. In the suction side of the gas recirculation loop, the suction line connects either directly to the gas suction conduit and/or to one or more, typically the first, of the flotation cell units.

When the suction line is connected directly to the gas suction conduit it allows transfer of flotation gas from the outside of the flotation cell unit(s) to the flotation cell unit(s) and vice versa via the gas suction conduit. Thus the suction gas conduit allows equalization of gas pressure between the cell units. Similarly when the suction line is connected to one of the flotation cell units it can be utilized to control the gas pressure of the cell units. A suction line comprising a water lock permits direct control of the gas pressure and operation of the flotation cells in slight underpressure while resisting the interchange of gases between the suction side of the gas recirculation loop, e.g. the gas suction conduit and the flotation cell unit(s), and the atmosphere by the pressure resistance caused by the water lock liquid column. With water locks, the headspaces of the flotation cell unit(s) can be maintained under an underpressure, preferably from 2 to 10 mbar, more preferably from 5 to 8 mbar.

The gas recirculation loop may also comprise a bleeding line for bleeding recirculating flotation gas from the loop when necessary. The bleeding line may also be provided with a scrubber, e.g. a packed bed scrubber, for cleaning the bleed gas before it is released to the atmosphere. Typically the bleed gas is released to the atmosphere through the same stack as the flotation gas expulsed from the flushing flotation cell unit.

The present invention further provides an arrangement for circulation of gases in a mineral flotation process, comprising a gas recirculation loop comprising a recirculating compressor 40 for pressurising recirculating flotation gas flow and a gas feed manifold 21, 22, 23, 24, 25 for providing the pressurized recirculating flotation gas into flotation cell units 11, 12, 13, 14, 15, means 20 for providing process gas into the gas recirculation loop, and a gas suction conduit 26 and optionally a sump suction conduit 27, for collecting flotation gas from the headspace(s) of the flotation cell unit(s) 11, . . . , 15, and optionally the headspace of a concentrate sump 32, respectively, and transferring it to the recirculating compressor 40;

a flushing system 80 comprising an expulsion line 81 for connecting pressure side 28 of the gas recirculation loop to atmosphere either directly or via a flushing line 29, which optionally comprises a scrubber 60, for allowing expulsion of a part of the flotation gas from the gas recirculation loop, and a suction line 82, 84 comprising a water lock, or means, other than a water lock, for restricting the gas flow and preventing back flow of unpurified gas to the atmosphere, for connecting the pressure side of the gas recirculation loop to the atmosphere either directly or through a flushing line 29 and for allowing gas, present in the flushing line or from the atmosphere, to be withdrawn into the suction side of the gas recirculation loop through the suction line thereby providing underpressure to the pressure side of the gas recirculation loop and thus to the flotation cell unit(s);

a gas suction conduit 26, and optionally conduit 27, for collecting flotation gas from the headspace of the flotation cell units 11, . . . , 15, and optionally the headspace of a concentrate sump 32, respectively, and transferring it to the recirculating compressor 40.

The present invention in particular provides an arrangement for circulation of gases in a mineral flotation process, comprising a gas recirculation loop comprising a recirculating compressor 40 for pressurising recirculating flotation gas flow and a gas feed manifold 21, 22, 23, 24, 25 for providing the pressurized recirculating flotation gas into flotation cell units 11, 12, 13, 14, 15, means 20 for providing process gas into the gas recirculation loop, and a gas suction conduit 26 and optionally a sump suction conduit 27, for collecting flotation gas from the headspace(s) of the flotation cell unit(s) 11, . . . , 15, and optionally the headspace of a concentrate sump 32, respectively, and transferring it to the recirculating compressor 40;

a flushing system 80 comprising an expulsion line 81 for connecting pressure side 28 of the gas recirculation loop to atmosphere either directly or via a flushing line 29, which optionally comprises a scrubber 60, for allowing expulsion of a part of the flotation gas from the gas recirculation loop, and a suction line 82, 84 comprising a water lock for connecting the pressure side of the gas recirculation loop to the atmosphere either directly or through a flushing line 29 and for allowing gas, present in the flushing line or from the atmosphere, to be withdrawn into the suction side of the gas recirculation loop through the suction line thereby providing underpressure to the pressure side of the gas recirculation loop and thus to the flotation cell unit(s);

a gas suction conduit 26, and optionally conduit 27, for collecting flotation gas from the headspace of the flotation cell units 11, . . . , 15, and optionally the headspace of a concentrate sump 32, respectively, and transferring it to the recirculating compressor 40.

FIG. 1 illustrates as a first embodiment of the invention an arrangement for gas circulation in a mineral flotation process, comprising a gas recirculation loop comprising a recirculating compressor 40 for pressurising recirculating flotation gas flow and a gas feed manifold 21, 22, 23, 24, 25 for providing the pressurized recirculating flotation gas into flotation cell units 11, 12, 13, 14, 15, means 20 for providing process gas into the gas recirculation loop, and a gas suction conduit 26 for collecting flotation gas from the headspaces of the sealed flotation cells and transferring it to the recirculating compressor;

a flushing system 80 comprising an expulsion line 81 for connecting the pressure side 28 of the gas recirculation loop to atmosphere via an optional gas scrubber 60 and a stack 70, for allowing expulsion of a part of the flotation gas from the gas recirculation loop, and a suction line 82, 84 comprising a water lock 83 for connecting the first flotation cell 11 to atmosphere and for allowing gas, present in the flushing line 29, to be withdrawn into the first flotation cell unit gas suction conduit through the suction line 82, 84 thereby providing underpressure to the said first flotation cell unit 11;

a gas suction conduit 26, and optionally conduit 27, for collecting flotation gas from the headspace of the flotation cell units 11, . . . , 15, and optionally the headspace of a concentrate sump 32, respectively, and transferring it to the recirculating compressor 40. A slurry 1 comprising valuable minerals and produced in preceding process steps is introduced into the first flotation cell unit 11. The slurry progresses though the following flotation cell units 12, . . . , 15 and is finally removed as tailings 9 from the last sealed flotation cell unit 15. Froth 2, . . . , 6 from the flotation cell units 11, . . . , 15 is collected from the top of each flotation cell unit via a launder system 30 and guided to a concentrate sump 32, The combined froth concentrate 8 can be treated in further flotation steps before it is subjected for further processing.

Pressurized flotation gas is supplied into each flotation cell unit 11, . . . , 15 via a gas feed manifold 21, . . . , 25. Each supply line is equipped with a individually adjustable control valve that regulates the distribution of the flotation gas to each of the flotation cell units. The supply of the flotation gas is controlled so that desired gas flow rate is reached in each of the flotation cell units as discussed above. A small portion of the flotation gas is expulsed to a flushing line 29 by an expulsion line 81, through a control valve.

The first flushing flotation cell unit 11 is connected to the atmosphere via a suction line 82, 84 comprising a water lock 83. The suction line allows adjustment of the gas pressure of the flotation cell units while the water lock prevents interchange of the gases between said flotation cell unit and atmosphere unless the pressure exceeds the required pressure for the gases to breach the water lock, thus permitting controlling the gas pressure and operation of the sealed cells in slight underpressure. In another words the water lock 83 restricts gas flow through the suction line 82, 84 and reduces the gas pressure of the gas flowing from the atmospheric side of the suction line 82 to the flotation cell side of the suction line 84 and acts as an interlock cutting off back flow of the unpurified flotation gas to the atmosphere. The pressure difference for breaching the water lock is determined by water lock depth. The depth is preferably 2 to 10 cm water column, resulting in 2 to 10 mbar pressure resistance. Thus water 85 is utilized to adjust the desired pressure.

The expulsed flotation gas is forced to flow to an optional scrubber 60, by the pressure generated by the compressor or blower 40. The expulsed gas is then preferably scrubbed in the scrubber 60 before releasing to the atmosphere through stack 70. When the flushing line comprises the scrubber 60, the suction line 82, 84 is preferably connected to the flushing line 29 after the scrubber to allow withdrawal of scrubbed expulsed gas.

Flotation gas from the flotation cell units 11, . . . , 15, and optionally from the headspace of the concentrate sump 32, is collected from the headspaces of the said flotation cell units and sump and guided into the gas recirculation loop via a gas suction conduits 26 and 27, respectively. The gas recirculation loop comprises at least one recirculating compressor 40, which may be of any suitable type, such as conventional fan blower or, preferably, a liquid ring compressor. The gas recirculation loop may also comprise a bypass conduit 41 which allows further control of the volume of the flotation gas feed to the flotation cells.

The gas recirculation loop also comprises means 20 for introducing process gas, typically nitrogen, into the recirculating loop. Process gas may be added either before or after the recirculating compressor 40. Introduction of process gas through means 20 causes an increase of total flotation gas volume, which can then compensated by expulsion of flotation gas through the expulsion line 81, controlled as desired by operation of the control valve comprised in the expulsion line 81.

When liquid ring compressor is utilized as the recirculating compressor the means 20 for introducing process gas into the gas recirculation loop are preferably arranged after the recirculating compressor 40. Process gas is added to the mineral flotation process in order to control the amount of flotation gas in the system and/or the oxygen level in the flotation gas and/or the electrochemical potential of the slurry and/or to expulse flotation gas with undesired byproduct gas, e.g. $H_2S$, which might be forming in the flushing cell unit(s). Utilization of an inert gas as the flotation gas reduces the consumption of flotation chemicals, such as NaHS, in the mineral flotation.

As a small portion of the flotation gas is emitted out of the system though expulsion line 81 corresponding volume of gas has to be replaced by supplying more gas by sucking gas back to the flotation cells through the suction line 82, 84 and water lock 83. Sucking the gas back through the water lock will cause the flotation cells to have a negative pressure in their headspaces. This provides the benefit of operating the forced-air flotation cells under a set negative headspace pressure. The negative headspace pressure is caused by the suction of the compressor/blower, to which the collected gas lines are directed. Also, while allowing a fraction of the gas to exit the closed recirculation loop, the system is able to constantly equalize its internal volume/pressure with that of the ambient air, due to the differential between the amount of gas which is blown out to the flushing line and the amount of gas which is sucked back in through the water lock. Any excess volume is expulsed from the flushing line to the stack, and any volume shortage will be automatically compensated by increased gas suction from the flushing line to the flotation cells.

Figure 2:
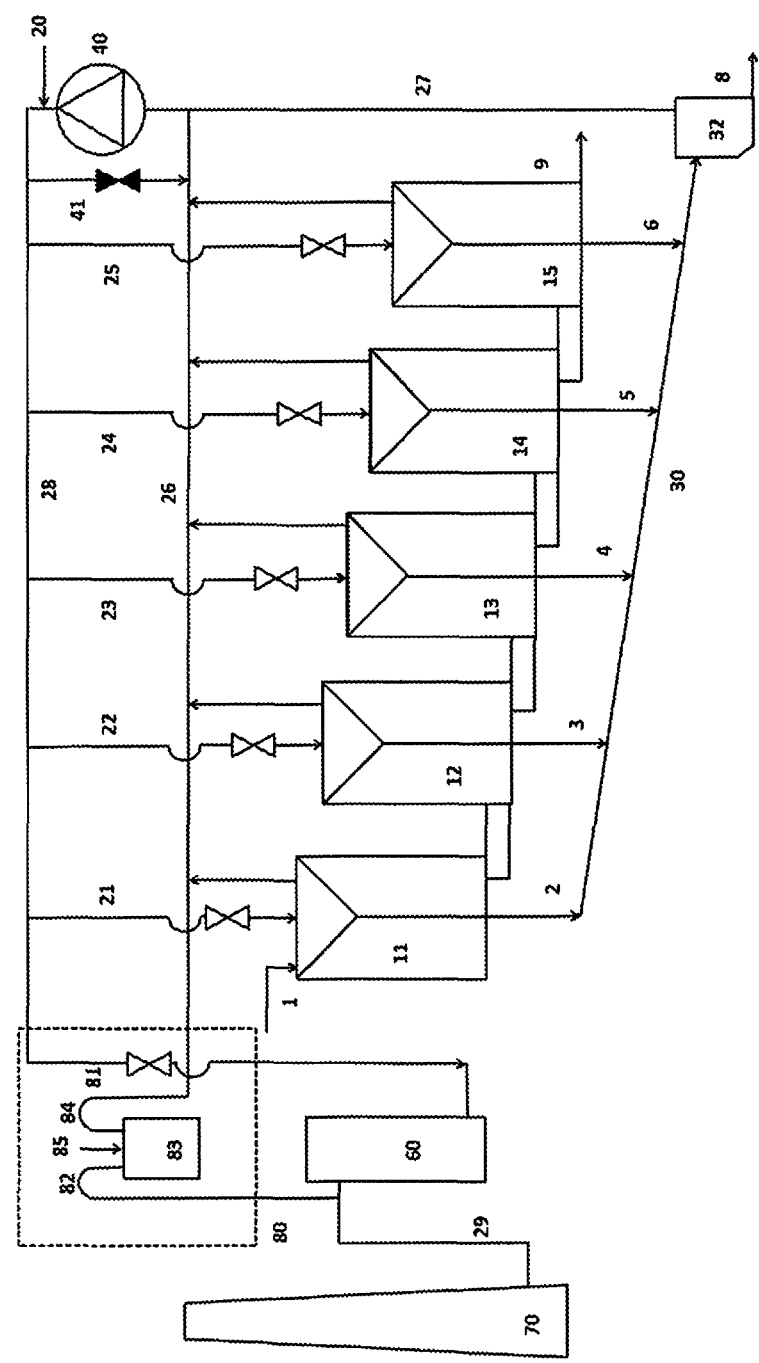
FIG. 2 shows a second embodiment of the arrangement of the present invention for circulation of gases in a mineral flotation process.

FIG. 2 illustrates as a second embodiment of the invention an arrangement in which the replacement gas is introduced directly into the gas suction conduit. In FIG. 2, like components are designated by the same reference numerals as used in FIG. 1.

In the flushing system 80 of the embodiment shown in FIG. 2, the expulsion line 81 for connecting the pressure side 28 of the gas recirculation loop to atmosphere is connected via a flushing line 29 comprising a gas scrubber 60 and a stack 70, for allowing scrubbing of the expulsed flotation gas before it is released to atmosphere. The expulsed flotation gas is forced to flow to the scrubber 60 through flushing line 29 by the pressure generated by the compressor or blower 40. The expulsed gas is then scrubbed in the scrubber 60 before releasing to the atmosphere through stack 70.

The suction line 82, 84 comprising the water lock 83 and connecting the gas suction conduit to atmosphere for allowing gas, present in the flushing line 29, to be withdrawn into the suction side of the gas recirculation loop is connected directly to the gas suction conduit 26. Connecting the suction line 82, 84 to the flushing line 29 after the scrubber 60 allows withdrawal of scrubbed gas. Connecting the suction line 82, 84 directly to the gas suction conduit 26 allows adjustment of the gas pressure of the flotation cell units while the water lock prevents interchange of the gases between said gas suction conduit and atmosphere unless the pressure exceeds the required pressure for the gases to breach the water lock, thus permitting controlling the gas pressure and operation of the sealed cells in slight underpressure. The pressure difference for breaching the water lock is determined by water lock depth. The depth is preferably 2 to 10 cm water column, resulting in 2 to 10 mbar pressure resistance.

Figure 3:
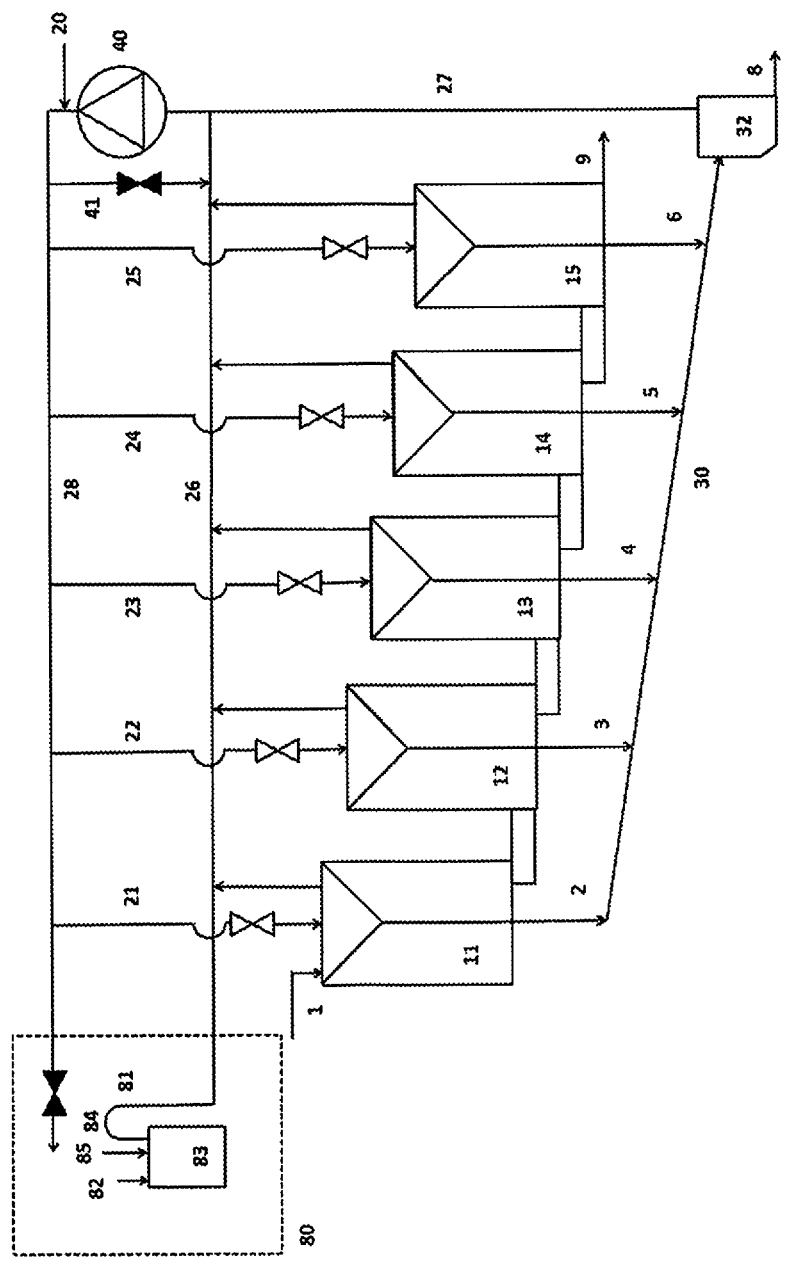
FIG. 3 shows a third embodiment of the arrangement of the present invention for circulation of gases in a mineral flotation process.

FIG. 3 illustrates as a third embodiment of the invention an arrangement in which the expulsed gas is released directly into the atmosphere without scrubbing and replacement gas is sucked directly in from the atmosphere to the gas suction conduit. In FIG. 3, like components are designated by the same reference numerals as used in FIGS. 1 and 2.

In the embodiment shown in FIG. 3 in the flushing system 80 the expulsion line 81 for connecting the pressure side 28 of the gas recirculation loop to atmosphere is connected directly to atmosphere allows expulsion of a part of the flotation gas from the gas recirculation loop directly to atmosphere, Similarly the suction line 82, 84 comprising the water lock 83 is connected directly to atmosphere and directly to the gas suction conduit 26 for thus connecting the suction side of the gas recirculation loop directly to atmosphere and for allowing gas, i.e. ambient air, from the atmosphere to be withdrawn directly in to the gas suction conduit 26 through the suction line 82, 84. This embodiment is suitable for mineral flotation processes where no harmful byproduct gases, e.g. H$_2$S, are formed and where the process tolerates minor amounts of oxygen introduced by the ambient air sucked in through the suction line.

Figure 4:
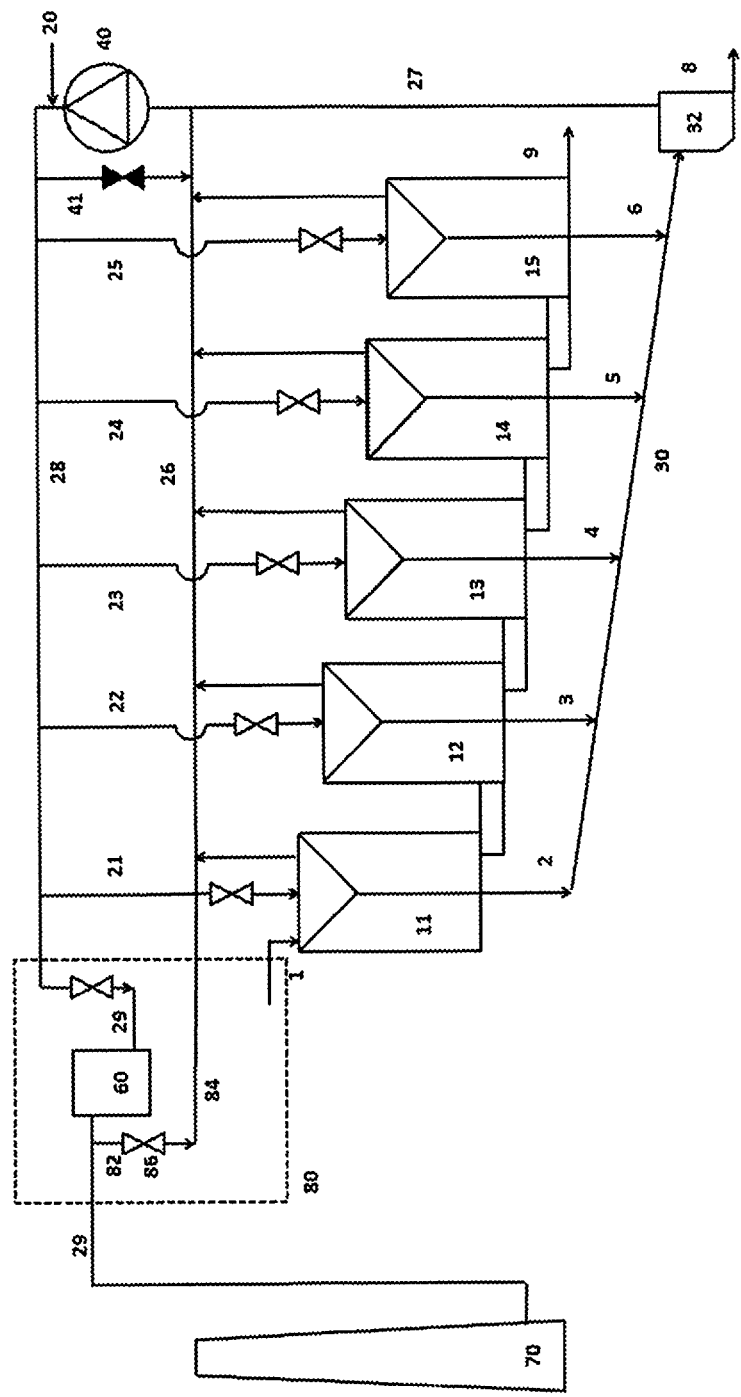
FIG. 4 shows a fourth embodiment of the arrangement of the present invention for circulation of gases in a mineral flotation process.

FIG. 4 illustrates as a third embodiment of the invention an arrangement in which the means for restricting the gas flow and preventing back flow of unpurified gas to the atmosphere is a control valve 86. In FIG. 4, like components are designated by the same reference numerals as used in FIGS. 1 to 3.

In the flushing system 80 of the embodiment shown in FIG. 4, the expulsion line 81 for connecting the pressure side 28 of the gas recirculation loop to atmosphere is connected via a flushing line 29 comprising a gas scrubber 60 and a stack 70, for allowing scrubbing of the expulsed flotation gas before it is released to atmosphere. The expulsed flotation gas is forced to flow to the scrubber 60 through flushing line 29 by the pressure generated by the compressor or blower 40. The expulsed gas is then scrubbed in the scrubber 60 before releasing to the atmosphere through stack 70.

The suction line 82, 84 comprising a control valve 86 and connecting the gas suction conduit to atmosphere for allowing gas, present in the flushing line 29, to be withdrawn into the suction side of the gas recirculation loop is connected directly to the gas suction conduit 26. The suction line 82, 84 comprising the control valve 86 allows adjustment of the gas pressure of the flotation cell by fully or partially opening or closing in response to signals received from controllers that compare pressure value provided by sensors that monitor changes in such conditions in the suction side of the gas recirculation loop, thus permitting controlling the gas pressure and operation of the sealed cells in slight underpressure. It also prevents interchange of the gases between said flotation cell unit and atmosphere. In another words the control valve 86 restricts gas flow through the suction line 82, 84 and reduces the gas pressure of the gas flowing from the atmospheric side of the suction line 82 to the flotation cell side of the suction line 84 and acts as an interlock cutting off back flow of the unpurified flotation gas to the atmosphere. The pressure is determined by the degree of the opening of the control valve 86. The opening preferably results in 2 to 10 mbar pressure resistance.

Figure 5:
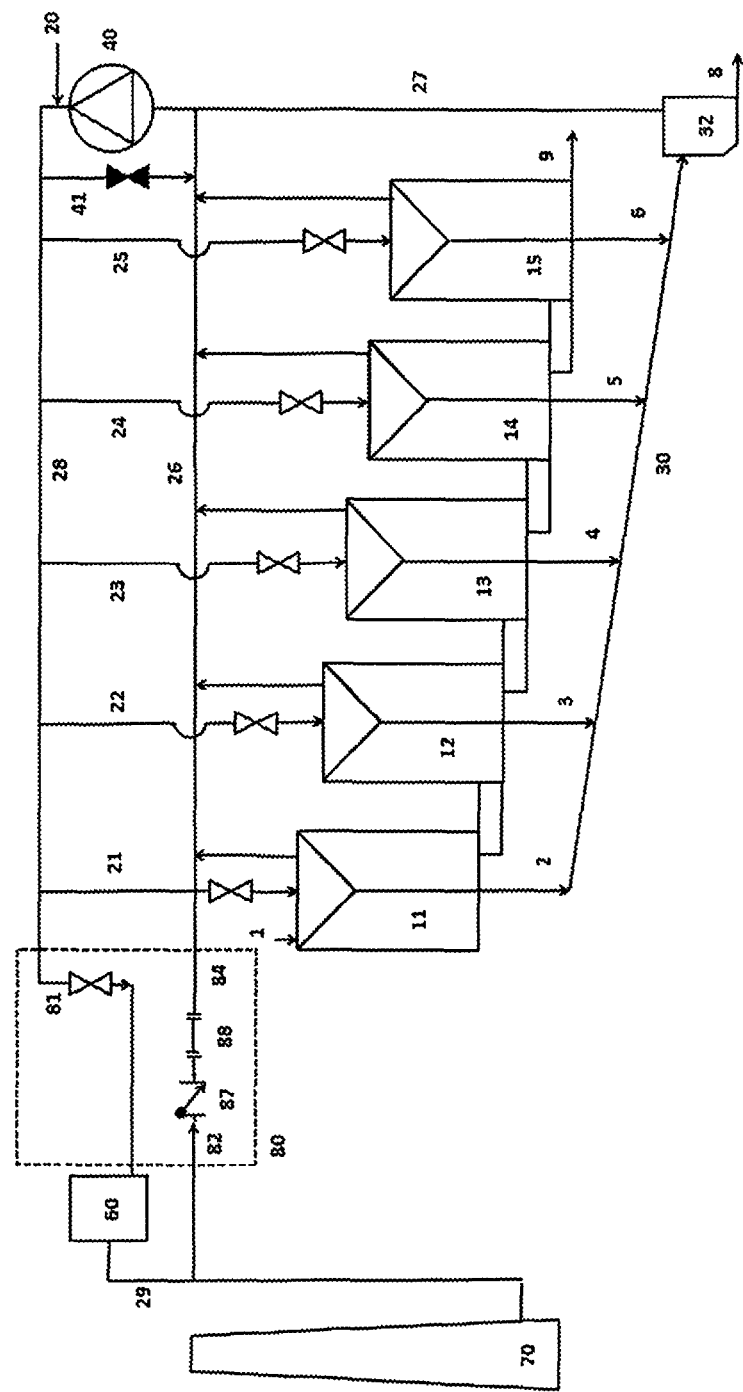
FIG. 5 shows a fifth embodiment of the arrangement of the present invention for circulation of gases in a mineral flotation process.

FIG. 5 illustrates as a fifth embodiment of the invention an arrangement in which the means for restricting the gas flow and preventing back flow of unpurified gas to the atmosphere comprises a gas restrictor 88 and a check valve 87 as an interlock. The gas restrictor 88 is interchangeable and the check valve 87 is positioned between the gas restrictor 88 and stack 70.

In FIG. 5, like components are designated by the same reference numerals as used in FIGS. 1 to 4. In the embodiment shown in FIG. 5 the the gas suction conduit 26 is directly connected to the suction line 82, 84 comprising a gas restrictor 88 and a check valve 87. The type and/or operation of the gas restrictor 88 determines the gas pressure of the flotation cells by e.g. the opening size of the aperture in diameter and length of a rigid disk or cylinder having an aperture at the central cylindrical axis chosen to insure that the gas flow is properly restricted in reducing the pressure in the flotation cell side of the suction line or a flow restricting membrane type or the material of a flow restricting packed-bed unit is chosen to insure that the gas flow is properly restricted in reducing the pressure in the flotation cell side of the suction line, or suitable operation of a pressure reducing valve, thus providing desired gas pressure and operation of the sealed cells in slight underpressure. The check valve 87 prevents interchange of the gases between said flotation cell unit and atmosphere. In another words the gas restrictor 88 restricts gas flow through the suction line 82, 84 and reduces the gas pressure of the gas flowing from the atmospheric side of the suction line 82 to the flotation cell side of the suction line 84 and the check valve 87 acts as an interlock cutting off back flow of the unpurified flotation gas to the atmosphere. The pressure is determined by the operation and/or type of the gas restrictor 88. The gas restrictor preferably provides 2 to 10 mbar pressure resistance.

Figure 6:
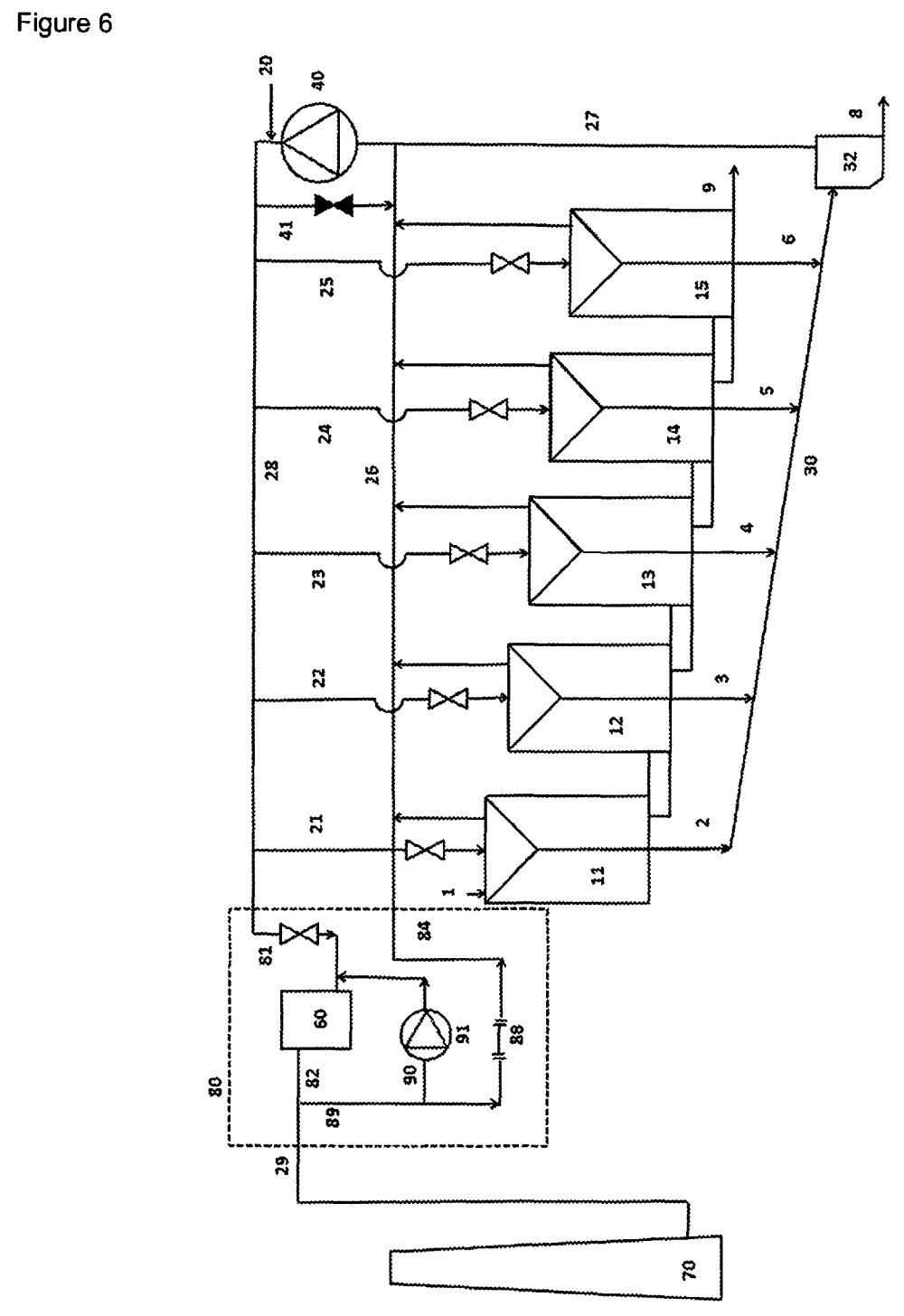

FIG. 6 illustrates as a sixth embodiment of the invention an arrangement in which the means for restricting the gas flow and preventing back flow of unpurified gas to the atmosphere comprises a gas restrictor 88 and an interlock which provided as a gas scrubber 60 comprising a bypass conduit 89.

In FIG. 6, like components are designated by the same reference numerals as used in FIGS. 1 to 5. In the flushing system 80 of the embodiment shown in FIG. 6, the expulsion line 81 for connecting the pressure side 28 of the gas recirculation loop to atmosphere is connected via a flushing line 29 comprising a gas scrubber 60 and a stack 70, for allowing scrubbing of the expulsed flotation gas before it is released to atmosphere. The expulsed flotation gas is forced to flow to the gas scrubber 60 through flushing line 29 by the pressure generated by the compressor or blower 40. The expulsed gas is then scrubbed in the gas scrubber 60 before releasing to the atmosphere through stack 70.

The suction line 82, 84 comprises a gas restrictor 88 as discussed in connection of FIG. 5 for restricting the gas flow. The suction line 82, 84 comprises a forced scrubbing loop 90 comprising a compressor 91 and connecting to the gas scrubber 60. The gas scrubber 60 further comprises a bypass conduit 89 which connects the flushing line 29 to the forced scrubbing loop 90 and the suction line 82, 84 for replacing the volume of gas forced through the scrubber and allowing gas to be withdrawn into suction side of the gas recirculation loop, whereby by a sucking action caused by a blower or compressor 91 positioned at the forced scrubbing loop 90, any expulsed flotation gas is forced to flow through the gas scrubber 60 towards the atmosphere and forces any expulsed flotation gas to flow through the gas scrubber 60 towards the atmosphere and preventing back flow of unpurified gas to the atmosphere.

In another words the gas restrictor 88 restricts gas flow through the suction line 82, 84 and reduces the gas pressure of the gas flowing from the atmospheric side of the suction line 82 to the flotation cell side of the suction line 84. The gas scrubber 60 and the bypass conduit 89 and the blower or compressor 91 act as an interlock preventing back flow of the unpurified flotation gas to the atmosphere by providing purified gas instead. The pressure is determined by the operation and/or type of the gas restrictor 88. The gas restrictor preferably provides 2 to 10 mbar pressure resistance.

It will be obvious to a person skilled in the art that, as the technology advances, the inventive concept can be implemented in various ways. The invention and its embodiments are not limited to the examples described above but may vary within the scope of the claims.

The invention claimed is:

1. A method for controlling gas circulation in a mineral flotation process in a system comprising one or more flotation cell unit(s) with an apparatus comprising a gas recirculation loop comprising a recirculating compressor or blower for pressurising recirculating flotation gas flow, a flushing system comprising an expulsion line for connecting pressure side of the gas recirculation loop to atmosphere and a suction line comprising a water lock or means, other than a water lock, for restricting gas flow through the suction line and preventing back flow of unpurified gas to the atmosphere, for connecting suction side of the gas recirculation loop to the atmosphere, wherein the method comprises:
supplying flotation gas from the gas recirculation loop to each of the flotation cell units;
expulsing a part of the flotation gas from pressure side of the gas recirculation loop via the expulsion line to bypass flotation cells to outside of the gas recirculation loop;
allowing gas to be withdrawn into suction side of the gas recirculation loop through the suction line, thereby providing underpressure to the said suction side of the gas recirculation loop and the flotation cell unit(s); and
collecting flotation gas from the headspace(s) of the sealed flotation cell unit(s) and recirculating the collected flotation gas back to the flotation cell units via the gas recirculation loop.

2. The method as claimed in claim 1, wherein the means, other than a water lock, for restricting the gas flow and preventing back flow of unpurified gas to the atmosphere comprises a gas restrictor and an interlock.

3. The method as claimed in claim 2, wherein the interlock is provided as a gas scrubber comprising a bypass conduit for replacing the volume of gas forced through the gas scrubber and allowing gas to be withdrawn into suction side of the gas recirculation loop, whereby either by a sucking action of a high pressure venturi scrubber or by a blowing action caused by a blower or compressor positioned in connection of the gas scrubber, any expulsed unpurified flotation gas is forced to flow through the gas scrubber towards the atmosphere.

4. The method as claimed in claim 1, further comprising controlling the amount of flotation gas by providing process gas to the gas recirculation loop to replace at least part of the flotation gas expulsed from the flushing system to the atmosphere.

5. The method as claimed in claim 1, wherein process gas is introduced into the gas recirculation loop in the pressure side of the recirculating compressor.

6. The method as claimed in claim 1, wherein gas, either in the atmosphere or present in the flushing line, is withdrawn into directly to the gas suction conduit.

7. The method as claimed in claim 1, wherein gas, either in the atmosphere or present in the flushing line, is withdrawn into the suction side of the gas recirculation loop via any one of the flotation cell units.

8. An arrangement for circulation of gases in a mineral flotation process, comprising:
a gas recirculation loop comprising a recirculating compressor or blower for pressurising recirculating flotation gas flow and a gas feed manifold for providing the pressurized recirculating flotation gas into flotation cell units, means for providing process gas into the gas recirculation loop, and a gas suction conduit and optionally a sump suction conduit, for collecting flotation gas from the headspace(s) of the flotation cell unit(s), and optionally the headspace of a concentrate sump, respectively, and transferring it to the recirculating compressor or blower;
a flushing system comprising an expulsion line for connecting pressure side of the gas recirculation loop to atmosphere either directly or via a flushing line for allowing expulsion of a part of the flotation gas from the gas recirculation loop to bypass flotation cells to outside of the gas recirculation loop, and a suction line comprising a water lock, or means, other than a water lock, for restricting gas flow through the suction line and preventing back flow of unpurified gas to the atmosphere, for connecting the pressure side of the gas recirculation loop to the atmosphere either directly or through a flushing line and for allowing gas, present in the flushing line or from the atmosphere, to be withdrawn into the suction side of the gas recirculation loop through the suction line thereby providing underpressure to the pressure side of the gas recirculation loop and thus to the flotation cell unit(s);
a gas suction conduit, and optionally conduit, for collecting flotation gas from the headspace of the flotation cell units, and optionally the headspace of a concentrate sump, respectively, and transferring it to the recirculating compressor or blower.

9. An arrangement for circulation of gases in a mineral flotation process as claimed in claim 8, comprising:
a gas recirculation loop comprising a recirculating compressor for pressurising recirculating flotation gas flow and a gas feed manifold for providing the pressurized recirculating flotation gas into flotation cell units, means for providing process gas into the gas recirculation loop, and a gas suction conduit and optionally a sump suction conduit, for collecting flotation gas from the headspace(s) of the flotation cell unit(s), and optionally the headspace of a concentrate sump, respectively, and transferring it to the recirculating compressor;
a flushing system comprising an expulsion line for connecting pressure side of the gas recirculation loop to atmosphere either directly or via a flushing line for allowing expulsion of a part of the flotation gas from the gas recirculation loop, and a suction line comprising a water lock for connecting the pressure side of the gas recirculation loop to the atmosphere either directly or through a flushing line and for allowing gas, present in the flushing line or from the atmosphere, to be withdrawn into the suction side of the gas recirculation loop through the suction line thereby providing underpressure to the pressure side of the gas recirculation loop and thus to the flotation cell unit(s);
a gas suction conduit, and optionally conduit, for collecting flotation gas from the headspace of the flotation cell units, and optionally the headspace of a concentrate sump, respectively, and transferring it to the recirculating compressor.

10. The arrangement as claimed in claim 8, wherein the suction line connects to the first gas suction conduit via any one of the flotation cell units, preferably via the first flotation cell unit.

11. The arrangement as claimed in claim 8, wherein the pressure side of the gas recirculation loop is connected directly to atmosphere.

12. The arrangement as claimed in claim 8, wherein the pressure side of the gas recirculation loop is connected to atmosphere via a gas scrubber and a stack.

13. The arrangement as claimed in claim 8, wherein the suction side of the gas recirculation loop is connected directly to the atmosphere.

14. The arrangement as claimed in claim 8, wherein the suction side of the gas recirculation loop is connected to the atmosphere through a flushing line.

15. The arrangement as claimed in claim 14, wherein the interlock is provided as a scrubber comprising a bypass conduit for replacing the volume of gas forced through the scrubber and allowing gas to be withdrawn into suction side of the gas recirculation loop, whereby either by a sucking action of a high pressure venturi scrubber or by a blowing action caused by a blower or compressor positioned in connection of the gas scrubber, any expulsed unpurified flotation gas is forced to flow through the scrubber towards the atmosphere.

* * * * *